(12) United States Patent
Balkany

(10) Patent No.: US 7,139,765 B1
(45) Date of Patent: Nov. 21, 2006

(54) HIERARCHICAL METHOD FOR STORING DATA WITH IMPROVED COMPRESSION

(76) Inventor: Alan Balkany, 418 Larkspur, Ann Arbor, MI (US) 48105-1125

( * ) Notice: Subject to any disclaimer, the term of this patent is extended or adjusted under 35 U.S.C. 154(b) by 0 days.

(21) Appl. No.: 09/541,631

(22) Filed: Apr. 3, 2000

(51) Int. Cl.
*G06F 17/30* (2006.01)
(52) U.S. Cl. ............................. 707/101; 707/100
(58) Field of Classification Search ........... 707/101, 707/102, 104, 3, 100, 103 X
See application file for complete search history.

(56) References Cited

U.S. PATENT DOCUMENTS

| | | | |
|---|---|---|---|
| 5,023,610 A | 6/1991 | Rubow et al. | |
| 5,245,337 A | 9/1993 | Bugajski et al. | |
| 5,293,164 A | 3/1994 | Bugajski et al. | |
| 5,592,667 A * | 1/1997 | Bugajski | 707/102 |
| 5,778,371 A * | 7/1998 | Fujihara | 707/100 |
| 5,966,709 A | 10/1999 | Zhang et al. | |
| 5,983,232 A | 11/1999 | Zhang | |
| 6,169,990 B1 * | 1/2001 | McGregor et al. | 707/101 |
| 6,529,912 B1 * | 3/2003 | Satoh et al. | 707/101 |
| 2002/0091700 A1 * | 7/2002 | Steele et al. | 707/100 |

OTHER PUBLICATIONS

Nomoto et al. Supervised ranking in open-domain text summarization, Annual Meeting of the ACL, 2001, pp. 465-472.*
Gope et al. Fast full-wave EFIE solution by low-rank compression of Multilevel Predetermined Sub-Matrices, Antennas and Propagation Society International Symposium, Jul. 3-8, 2005, pp. 184-187.*
Tsay et al. Data compression on multifont Chinese character pattern, Image Processing, Mar. 1994, pp. 139-146.□□*
Gruter et al. Rank-order polynomial subband decomposition for medical image compression, Medical Imageing, IEEE transactions, Oct. 2000, pp. 1044-1052.*
Sadakane K. Text compression using recency rank with context and relation to context sorting, block sorting and PPM, Compression and complexity of Sequences 1997, Jun. 11-13, 1997, pp. 305-319.*

* cited by examiner

*Primary Examiner*—Jean M. Corrielus
*Assistant Examiner*—Baoquoc N. To

(57) ABSTRACT

A hierarchical data-compression method is described, with a compact form for sequences of consecutive tuples (and other techniques) to save space. A method for efficiently processing a subset of record fields is described. A flexible method for designing the data hierarchy (tree) is described.

20 Claims, 11 Drawing Sheets

| Record | City | First Name | Last Name | Shoe Size |
|---|---|---|---|---|
| 1 | Plymouth | John | Smith | 9 |
| 2 | Plymouth | John | Doe | 8 |
| 3 | Plymouth | Bill | Smith | 7 |
| 4 | Detroit | Jeff | Smith | 8 |
| 5 | Detroit | John | Jones | 8 |
| 6 | Detroit | Bill | White | 9 |
| 7 | Detroit | Tom | Black | 9 |
| 8 | Detroit | Dave | Smith | 6 |
| 9 | Detroit | Frank | Jones | 7 |
| 10 | Pontiac | Bill | Jones | 9 |
| 11 | Pontiac | Jeff | Black | 8 |
| 12 | Pontiac | Frank | Doe | 8 |

Fig 1

$$[(1,1) \quad (2,2) \quad (3,3) \quad (4,4) \quad (5,5) \quad (6,6)] + (4,4)$$

Fig 10

$$(0, 1, 1, 6) \quad + \quad (4, 4) \text{ count } 1$$

Fig 11

$$\begin{bmatrix} (1, 1) & (2, 2) & (3, 3) \\ (5, 5) & (6, 6) \end{bmatrix} \quad + \quad (4, 4) \text{ count } 2$$

Fig 12

$$(0, 1, 1, 3) \quad + \quad (3, 4, 4, 2)$$
$$(4, 5, 5, 2)$$

Fig 13

HIERARCHICAL METHOD FOR STORING DATA WITH IMPROVED COMPRESSION

CROSS-REFERENCE TO RELATED APPLICATIONS

Not applicable

BACKGROUND

1. Field of Invention

This invention relates to data storage, specifically to an improved data compression method.

2. Description of Prior Art

Data compression gives data processing systems several performance advantages over non-compressed systems:

1. It allows larger data sets to be contained entirely in main memory. This allows faster processing than systems that must access the disk.

2. It allows a task to be performed while processing fewer bytes. This further speeds processing.

3. It provides a more compact form for archival, transmission, or reading/writing between memory and disk.

Previous patents have described variants on a hierarchical compression scheme. It is necessary to first describe the approaches used in prior art. FIGS. 1 and 2 illustrate the data structures of a scheme that represents features common to the following U.S. Pat. Nos. 5,023,610 (1991), 5,245,337 (1993), 5,293,164 (1994), 5,592,667 (1994), 5,966,709 (1999), 5,983,232 (1999).

FIG. 1 shows a set of records to be compressed. Each record has four fields: City, First Name, Last Name, and Shoe Size. These fields can be considered to be four parallel data input sequences. Each sequence is an ordered set of values for one field over the record set.

FIG. 2 shows the tree structure used in prior art to represent this record set. At the bottom of FIG. 2, the "leaves" of the tree are dictionaries (50) that each correspond to one field in the record. A dictionary contains one entry for each unique value of the corresponding field. The entry is the unique value and a count of the number of times the value occurred in the stream of values from the field. For example, in the City dictionary, the value for one entry is "Detroit" and its count is 6.

When a value is encountered that was previously seen in the input sequence, it is not added to the dictionary. Instead, the count associated with that value in the dictionary is incremented.

A token is the (zero-based) order of a value in a dictionary. A token uniquely identifies a value in a dictionary. For example, the tokens 0 and 1 identify the values "John" and "Bill" respectively, in the First-Name dictionary in FIG. 2.

The nonleaf nodes ("interior nodes") (51) in FIG. 2 represent tuples of tokens from lower (leaf or interior) nodes. Here, for simplicity, the tuples are all pairs of tokens, each consisting of a left and a right member. (Higher-order tuples could also be used).

Each interior node here maintains a list of token pairs from its left and right child nodes. For example, the interior node above the Last-Name and Shoe-Size leaves (52) contains pairs of tokens from these fields' dictionaries on the left and right. These token pairs are in the order their corresponding values were first seen in the Last-Name and Shoe-Size input sequences.

For example, the first left/right pair in (52) is (0, 0). This denotes token 0 from the LastName dictionary and token 0 from the Shoe-Size dictionary. This stands for the values "Smith" and "9" for the Last-Name and Shoe-Size fields in the first record.

Likewise, the second left/right pair in (52), 1, 1), stands for the value pair, ("Doe", "8"), in the second record. Each has a count of 1. If a token pair is the same as one recorded earlier, a new entry is not made. Instead, the count for that pair is incremented.

Each unique left/right token pair in an interior node is also assigned a token, representing the order that pair was first encountered from the left and right child nodes. For example, the tokens 0 and 1 is in (55) correspond to the left/right token pairs, (0, 0) and (0, 1).

Likewise, the root node, (56), represents unique token pairs from nodes (52) and (55), in the order they were first encountered. The root node (56) represents every unique record in the tree. For example, to reconstruct the third record, we look at the third token (token 2) in the root node (52). This has left and right values of 1 and 2.

We look up token 1 in the root's left child (55) and get left and right values of 0 and 1. This are tokens for values in the City and First-Name dictionaries, respectively, which are "Plymouth" and "Bill", from the third record. A similar lookup with token 2 in interior node (52) gives "Smith" and "7" for the rest of the record.

Note that all the counts for token pairs at the root node are 1. Also note that there are consecutive runs where the left and right token numbers are each one more than the left and right token numbers in the previous entry. This can be seen for tokens 1 through 10 in the root node (56). For any given token in this range, we can get the left and right pair of the next token in the range by adding left and right elements of the given token.

For example, in node (56), the left/right pair for token 5 (4, 5) has each element one more than the left/right pair for token 4 (3, 4).

Exhaustively representing all the token pairs in a sequence with such a regular pattern wastes a considerable amount of space.

Also if other trees are constructed to represent subsets of the data in the first tree, the dictionary values used must be duplicated in the leaves of these other trees. This redundancy also wastes a considerable amount of space. It also wastes the processing time it takes to duplicate the dictionaries.

U.S. Pat. No. 5,966,709 (1999) described a method of optimizing said tree structure. Said method used a variant of the Huffman Algorithm, which can produce sub-optimal tree designs when the value function is complex or nonmonotonic. Said method also calculates the exact size of a parent node by counting the tuples formed by the child nodes joined, which is computationally expensive.

U.S. Pat. Nos. 5,023,610 (1991), 5,245,337 (1993), and 5,293,164 (1994) described the compression of a single stream of data, while this invention describes the compression of multiple parallel sequences of data.

SUMMARY

In accordance with the present invention, an improved hierarchical data compression method uses:

a) a more compact method for representing tuple sequences, which saves memory and time, b) data dictionaries shared among trees to avoid redundancy, which saves memory and time, c) an efficient method of processing a subset of a tree's leaves, and d) a flexible method of designing the tree.

OBJECTS AND ADVANTAGES

Accordingly, several objects and advantages of my invention are:

(a) to provide a more compact representation of data, by compressing an interior node's tuples, which saves space:
  (1) allowing larger data sets to be contained in main memory.
  (2) speeds the transfer of said interior node between secondary storage and main memory,
  (3) speeds the transfer of said interior node over a communication channel,
  (4) speeding up processing by allowing a task to be performed while processing fewer bytes, and
  (5) allowing data sets to be archived more efficiently;

(b) to provide a more compact representation of data by separating a tree's leaves from their corresponding dictionaries, which:
  (1) saves space when processing multiple trees which share the same dictionaries, by avoiding redundant copies of dictionaries
  (2) speeds the transfer of multiple trees between secondary storage and main memory, by only having to move one copy of each dictionary,
  (3) speeds the transfer of multiple trees over a communication channel,
  (4) saves space, allowing multiple trees to be archived more efficiently;
  (5) speeds the creation of subsets of a tree, by avoiding rebuilding the dictionaries
  (6) allows further compression by run-length encoding the leaves, which can be mainly an array of counts for values;

(c) to provide an efficient method for accessing a subset of a tree's leaves; and (d) to provide a flexible method for designing a tree, which permits a variety of design strategies and preference heuristics.

DRAWING FIGURES

FIG. 1 is a set of records to be compressed

Figure 9:
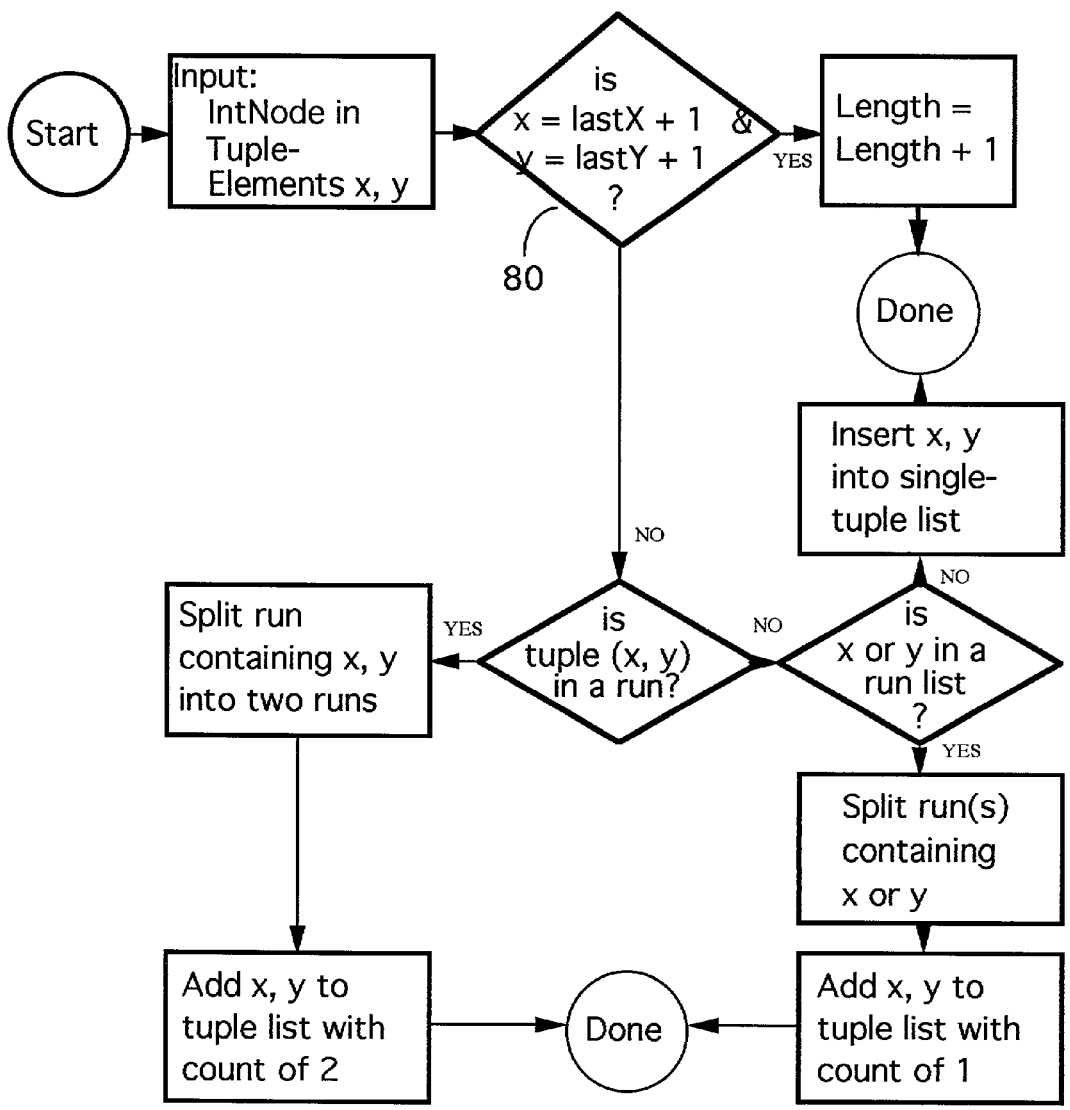
Figure 10:
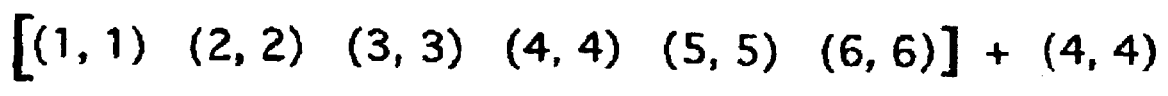
Figure 14:
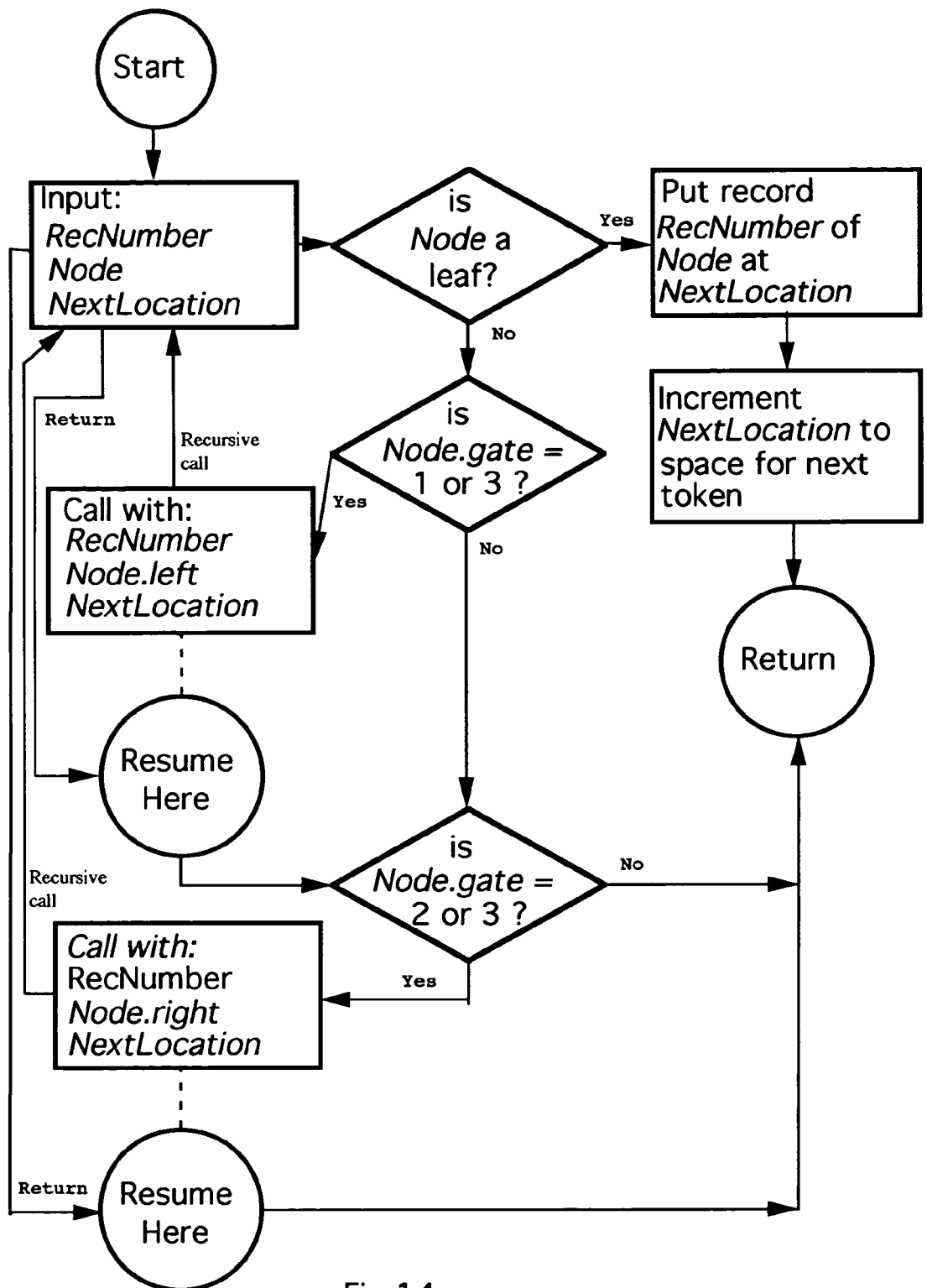
Figure 15:
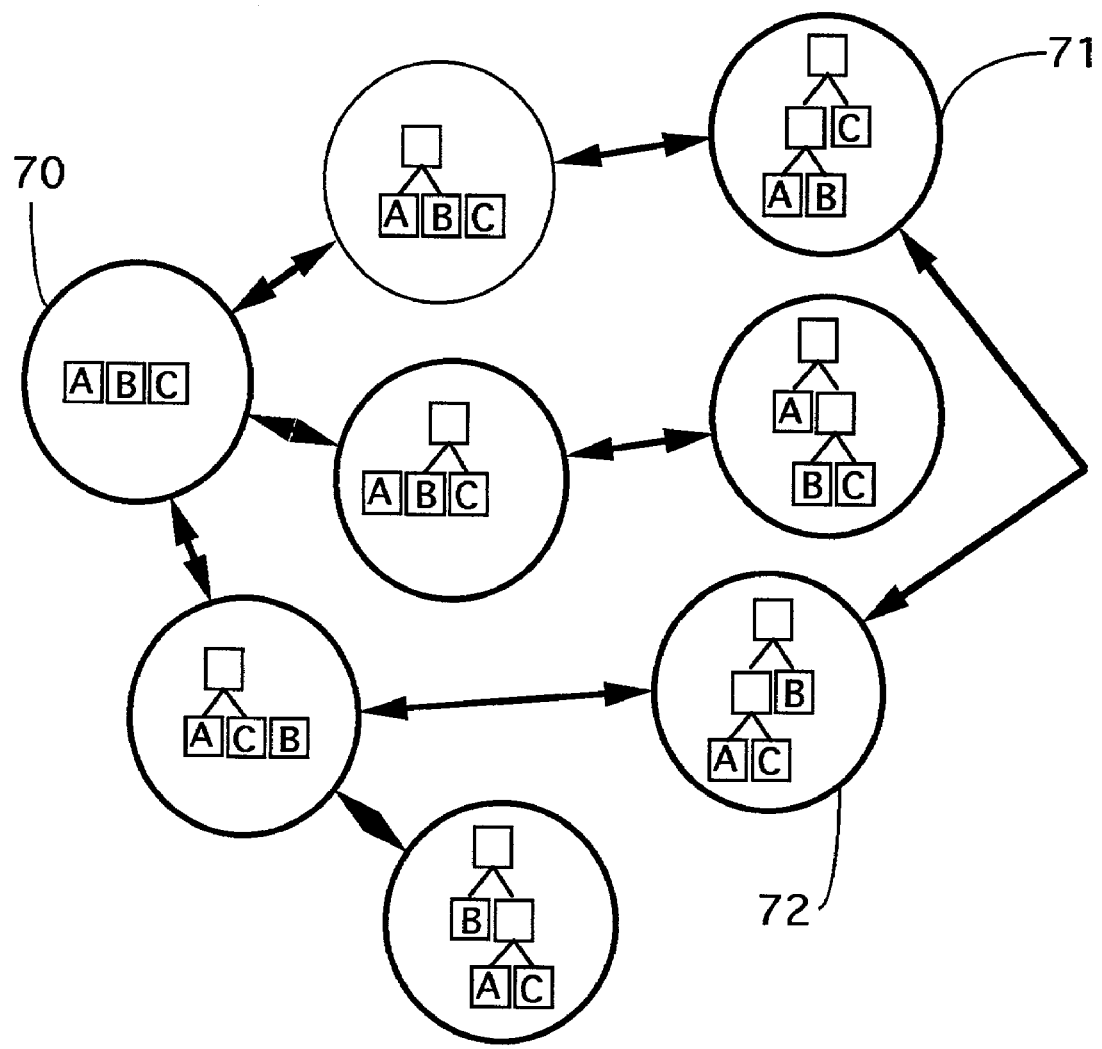
Figure 16:
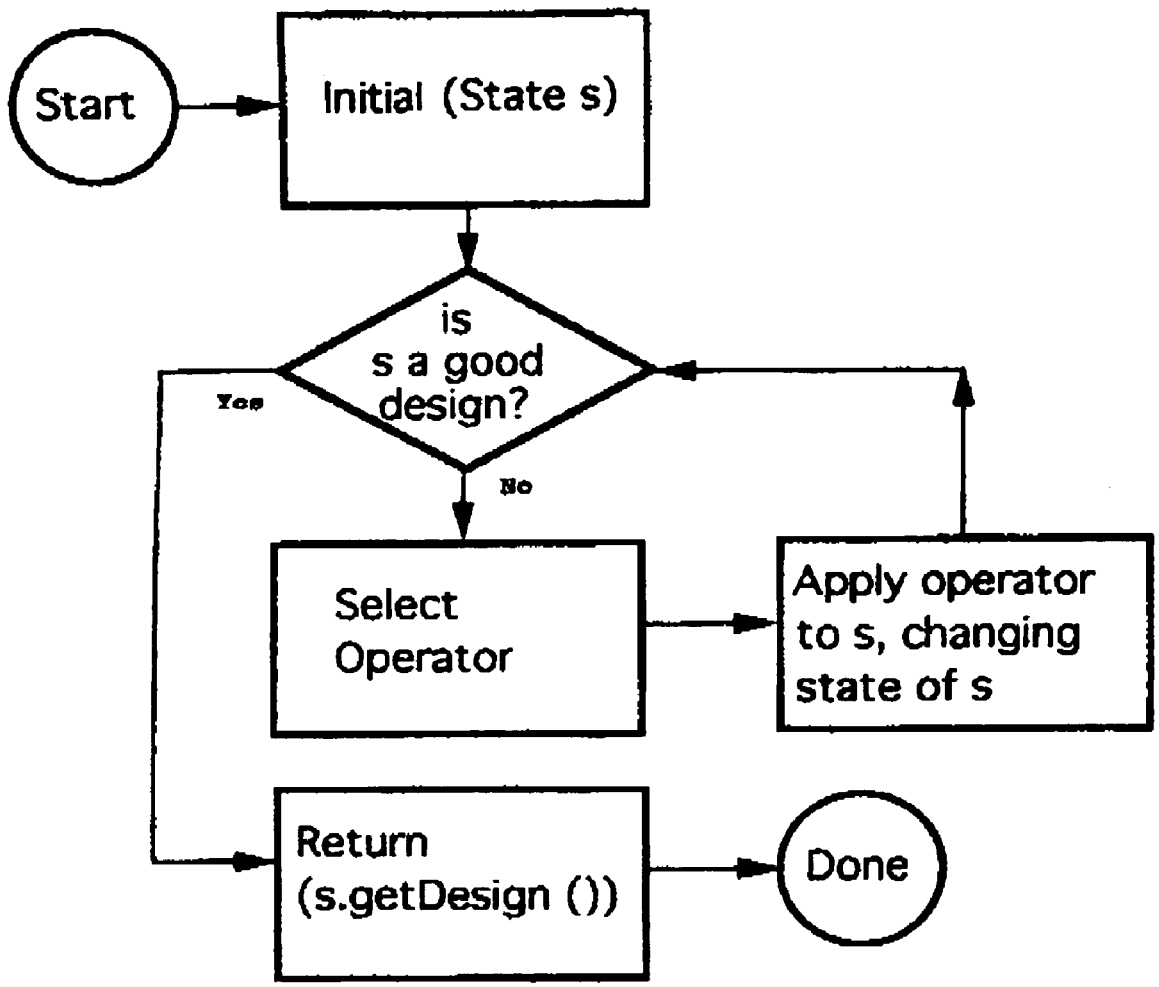

FIG. 9 shows the algorithm for adding a tuple to an interior node that stores tuple runs separately FIG. 10 shows a single tuple being added to a set containing a tuple run FIG. 11 shows the tuples of FIG. 10 represented with my method FIG. 12 shows the state of the interior node after the tuple addition FIG. 13 shows the tuples of FIG. 12 represented with my method FIG. 14 shows an algorithm for retrieving a subset of a token record FIG. 15 shows part of a problem space used in the design of a tree FIG. 16 shows the general algorithm used to search a problem space

REFERENCE NUMERALS IN DRAWINGS 50 leaf node, prior art
51 interior node, prior art
52 interior node over Last-Name and Shoe-Size leaves, prior art
53 the Last-Name dictionary, prior art
54 the Shoe-Size dictionary, prior art
55 interior node over City and First-Name leaves, prior art
56 the root node, prior art
57 token 2's entry in the root node, prior art
60 dictionaries, my method
61 leaves, my method
62 interior nodes, my method
63 the root node, my method
64 the single-tuple list in the root, my method
65 the tuple-run list in the root, my method
66 the City leaf node, my method
70 the initial state in the tree-design problem space
71, 72 two states in the problem space
80 the test whether a new pair extends the current tuple run

DESCRIPTION—PREFERRED EMBODIMENT

1. Tree structure

Figure 3:
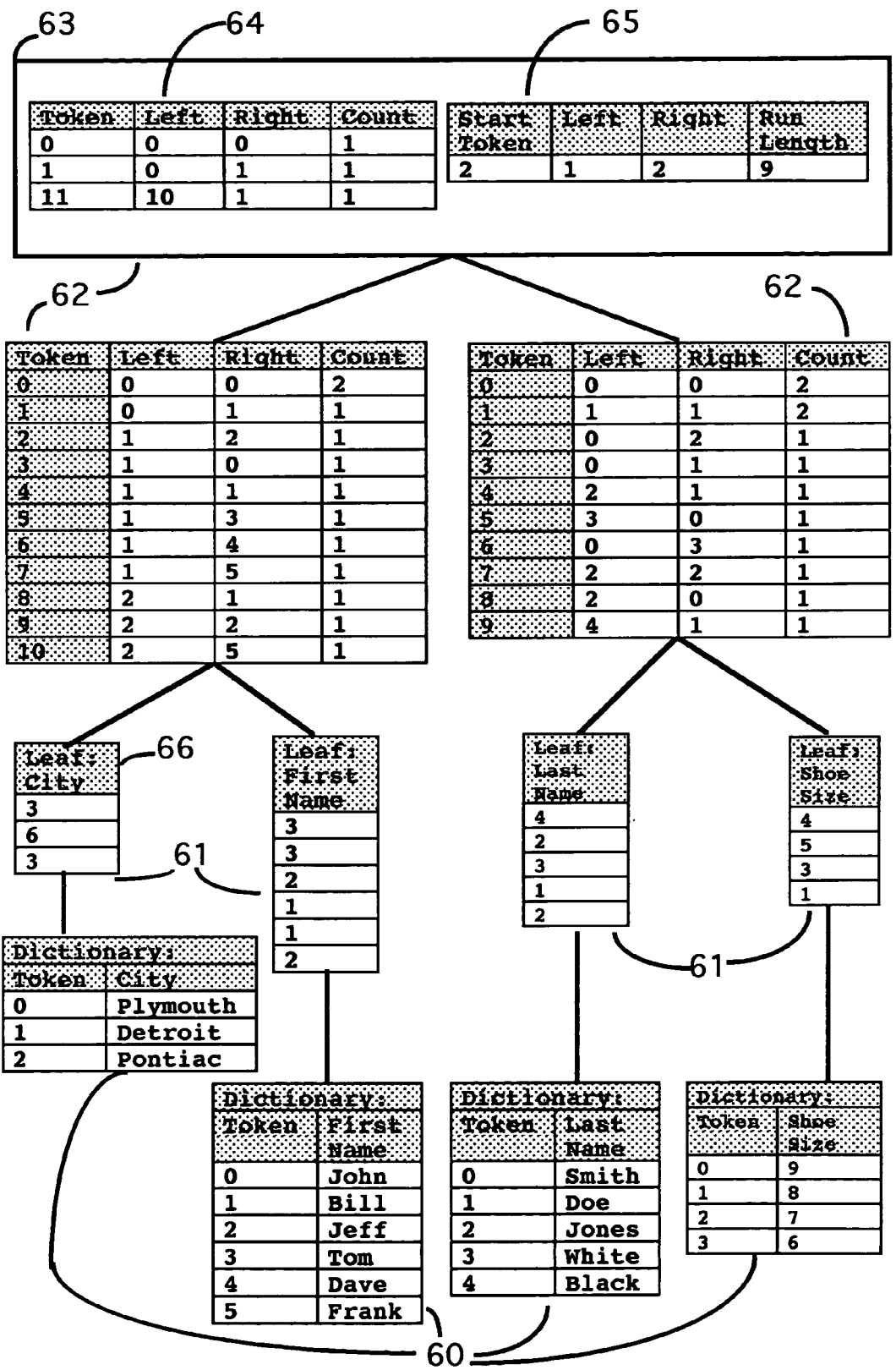
FIG. 3 is a schematic of my storage method

FIG. 3 shows an example of the storage method. The dictionaries (60) each associate the unique values of a field with a token number.

The tree leaves (61) are each associated with one dictionary, and represent a subset of that dictionary's values. In FIG. 3, each leaf contains an array of counts, where the nth count is the number of times the nth dictionary value occurs in the input data sequence for that leaf.

Definition: Run of unique, mutually-consecutive tuples.

A sequence of tuples such that the elements of each tuple are each one more than the elements of the previous tuple, e.g.:

{(10, 20) (11, 21) (12, 22) (13, 23)} is a run of mutually-consecutive tuples. If all of the left tokens in this run only appear once, in said run, and all of the right tokens in this run only appear once, in said run, this run is called a "run of unique mutually-consecutive tuples". We will refer to such a run as a tuple run for short.

Figure 2:
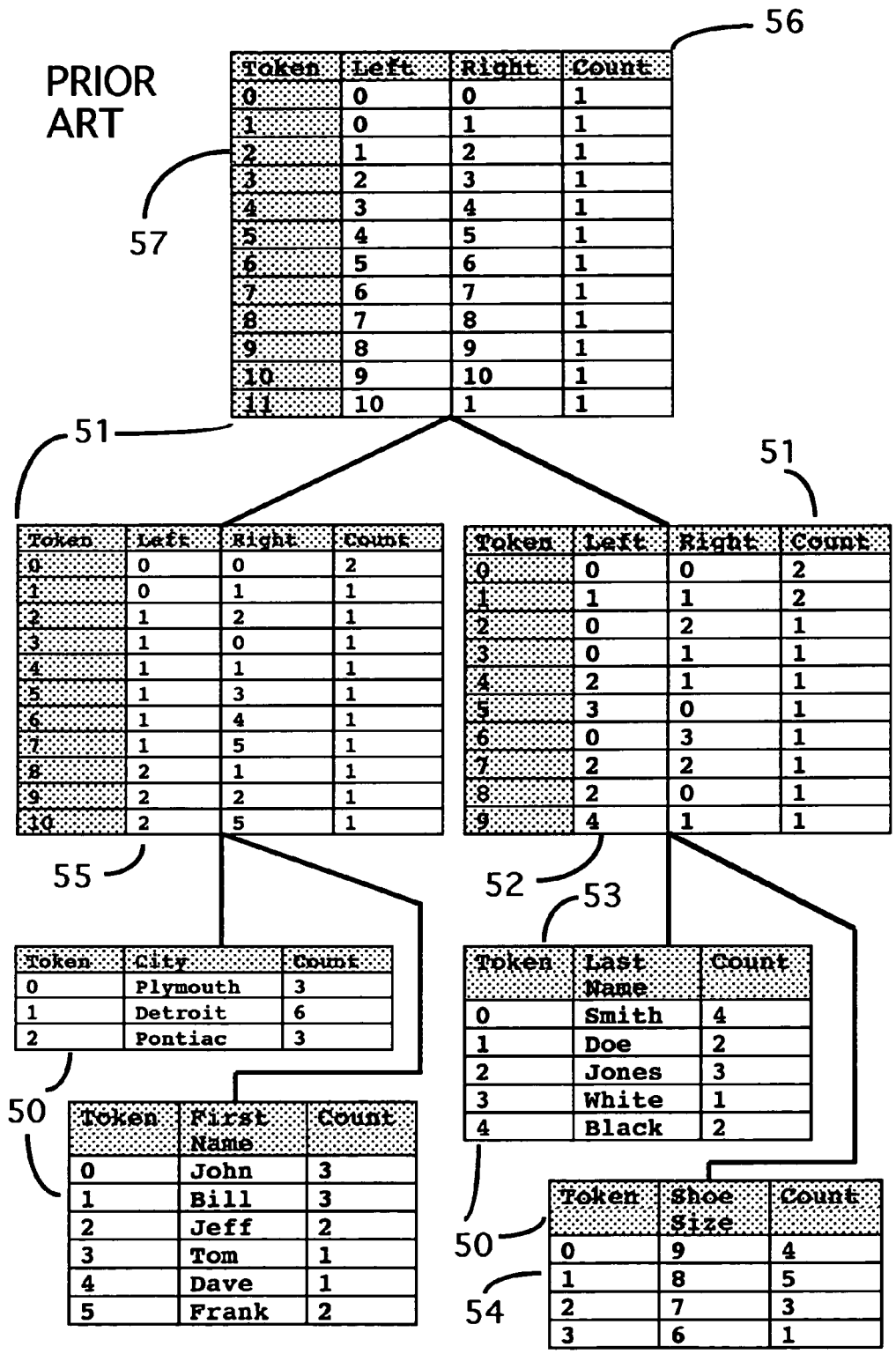
FIG. 2 is prior art compression schemes

Interior nodes (62) may store tuple runs separately from individual tuples. For example, this is done in the root node (63), which contains two lists: the first one a lists of single tokens (64), and the second one, a list of tuple runs (65). (For comparison, the root node (56) in FIG. 2 represents exactly the same set of tuples as the root node (63) in FIG. 3).

The tuple list (64) contains the single tuples corresponding to tokens 0, 1, and 11. The tuple run list (65) contains one run of nine tuples. The run length of tuple run list (65) is nine and describes multiple tuples with a single entry. The run list, in this case, takes one ninth as much space as explicitly representing the nine tuples.

2. Separation of dictionaries and leaves

Each leaf represents a subset of values from its corresponding dictionary. This can be done, for example, with an array of counts, such that the nth count is the number of times the nth dictionary value occurs in the leaf's input data sequence.

For example, the City leaf (66) in FIG. 3 contains the counts, "3, 6, 3". These stand for the number of times the cities, Plymouth, Detroit, and Pontiac, respectively, occurred in the City input data sequence.

A leaf's count array may contain many consecutive repetitions of the same count, and may be further compressed using run-length encoding.

3. Interior node gating

Each interior node has an integer, gate, associated with it. When access to only a subset of a tree's fields is needed for a record, we can speed up the process using the interior nodes' gates.

We store a value in each gate that tells if either of the interior node's subtrees contains a field in the subset we're interested in. This allows us to skip searching down subtrees that don't have any fields in the subset of fields we're looking for.

Figure 6:
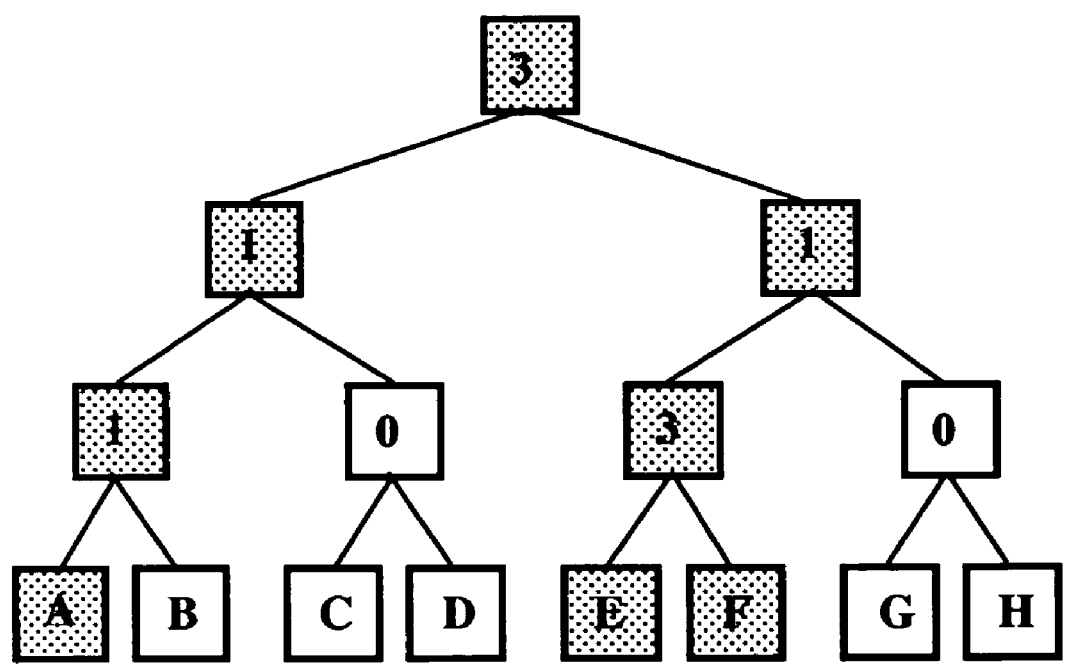
FIG. 6 shows the nodes visited and avoided by gating

For example, see FIG. 6. The shaded nodes are the ones we'd have to visit to retrieve value from nodes A, E, and F for a record. The number in each interior node in FIG. 6 is the gate value to visit only leaf nodes A, E, and F.

A gate value of 0 means neither subtree contains a field in the subset. A value of 1 or 3 means the left subtree contains a field in the subset. A value of 2 or 3 means the right subtree contains a field in the subset.

Gating here visits 8 of 15 nodes, approximately halving the number of node visits required.

4. Tree construction process

A tree is constructed for a set of fields which have corresponding dictionaries. The design process is modeled as a search of a problem space with operators and a value function.

A problem space is:
(a) a set of states such that, each state represents a partial tree design; the leaves and zero or more interior nodes, each interior node the parent of tow of more other nodes,
(b) one or more operators that transform one state to another, and
(c) a value function, giving a numeric ranking of the value of any state's design, The design process starts from an initial state in the problem space, and applies operators to move to other states, until an acceptable design is reached.

Typical operators are: (a) joining multiple nodes under a new interior node, (b) a delete operation: deleting an interior node and separating its child nodes, (c) swapping two nodes.

Typical value functions may include the sizes of the interior nodes, preferences for certain fields to be near each other, and preferences that certain fields permit fast access.

For example, FIG. 15 shows part of a problem space. The initial state (70) of the problem space contains three leaves: A, B, and C. The three states the initial state can reach in FIG. 15 are each reached by applying the "Join" operator. This operator joins two nodes in a state, under an new interior node. In each of said three states, two of the leaves that were unjoined in the initial state are now joined.

We can transition from state (71) to state (72) in FIG. 15, using the "Swap" operator. This operator exchanges the positions of two nodes, here, B and C.

Applying the swap operator a second time undoes the swap operation, in effect, backtracking to the previous state in the problem space. The "Delete" operator deletes an interior node, which is the inverse of the join operator, so it can backtrack from a join. Backtracking allows the problem space to be searched for an acceptable design.

DESCRIPTION—ALTERNATIVE EMBODIMENTS (a) Tuple run storage in interior nodes can be selectively enabled, storing only single tuples in the nodes where it has been disabled.

This avoids the overhead of two lists for lower interior nodes, where tuple runs are less frequent.

(b) Leaves can contain an array of Booleans, where the nth Boolean is TRUE if the nth dictionary value is present in a tree. This can be stored as a bit array, which is more compact than storing the counts, and can be further compressed by run-length encoding the bits.

(c) When designing a tree, the size of an interior node can be quickly approximated as a predetermined fraction of the product of said interior node's children's sizes. Although not optimal, this is much faster that the laborious calculations of the parent's exact size required by an optimal algorithm. A value of ⅓ for said fraction produces reasonable results.

Operation

Figure 7:
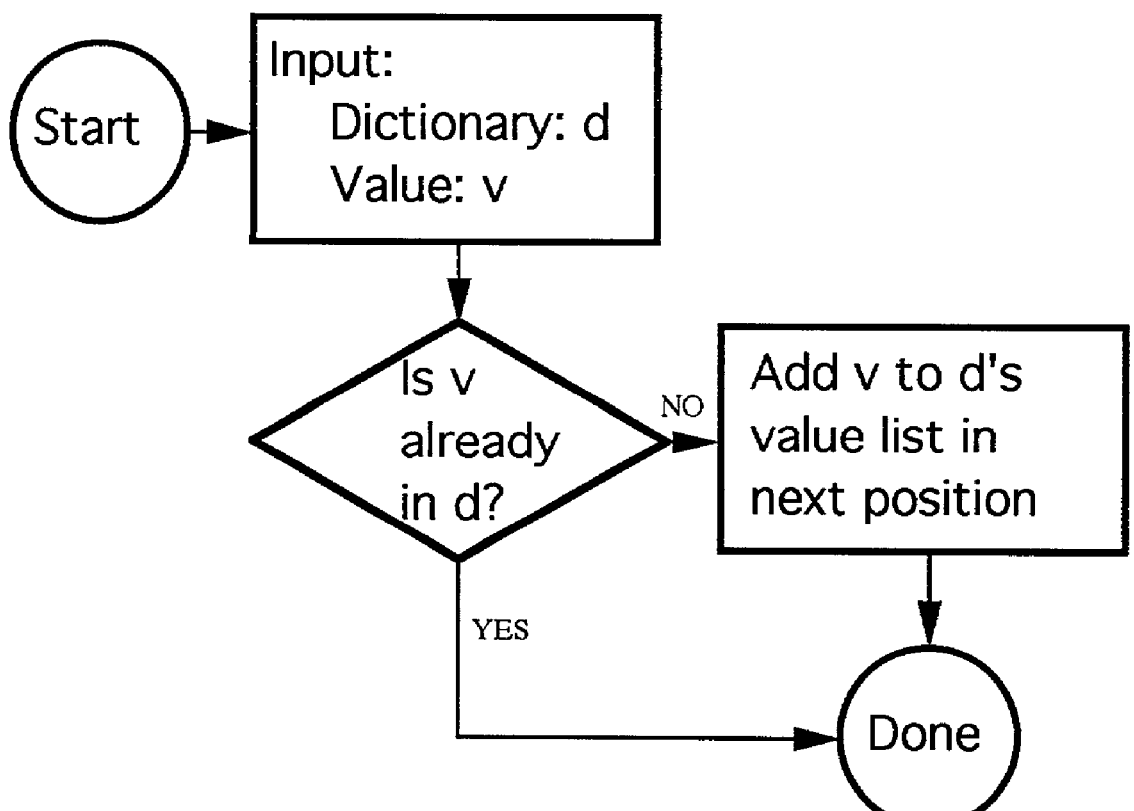
FIG. 7 shows the algorithm for adding a value to a dictionary

There are four basic operations on my invention:
1. Dictionary construction
2. Tree construction
3. Token record insertion
4. Access to a subset of a record 1. Dictionary Construction FIG. 3 (60) is an example of four dictionaries, each of which associates a unique token number with each unique value that occurs in one field. FIG. 7 shows the algorithm for adding a value to a dictionary. If the value is not already in the dictionary, it is added to the dictionary, and associated with the next unused token number.

2. Tree Construction

Tree construction is modeled as a search through a problem space. See FIG. 15 for part of a problem space. FIG. 16 shows the general algorithm used. Operators are iteratively selected and applied to the current design state to obtain the next design state.

The process terminates when the current state represents an acceptable design. By varying the available operators and/or how they are selected, different problem-space search behaviors can be produced 3. Record Addition When a record is added to a tree, each field value is first processed by a dictionary, mapping it to a token number. Thus the record is transformed into an equivalent record composed of tokens representing the original field values.

Each interior node has two children which may be either leaves or interior nodes. Each pair of tokens from sibling nodes is sent to their parent interior node. The parent node checks if this pair (tuple) of values is already stored. If not, the tuple of values is associated with the next unused token number, and stored in the parent node with a count of 1. If it is already stored, its count is incremented.

The interior node then, in turn, sends the token number associated with this pair of its parent. Thus, at each interior level, pairs (tuples) of tokens are recorded and mapped to single tokens. These pairs can later be looked up by their associated token number.

Interior Node Storage

An interior node has a list of the left/right token pairs it has been sent from its left and right children. The interior node may optionally keep a list of pair (tuple) runs that have occurred. FIG. 9 is a flow chart that shows how a pair is added to an interior node that stores tuple runs separately.

When a tuple is added to an interior node, there are four possible results:

(a) It can extend a tuple run.

This corresponds to the first decision diamond (80) in FIG. 9: "is x=lastX+1 & y=lastY+1?. If true, it means the pair, x, y, extends a tuple run. Thus, just incrementing the length field of the current tuple run records the addition of this pair of this interior node.

(b) It can invalidate one or more existing runs by duplicating any of their tokens.

This situation is illustrated in FIGS. 10–13. FIG. 10 diagrams a tuple, (4, 4) being added to a tuple run with six elements. The tuple run would actually be represented as in FIG. 11, with the following fields: (start token, start left value, start right value, run length). So (0, 1, 1, 6) stands for the run starting with token 0, and left and right values starting at (1, 1), and length 6.

All left and all right values in a tuple run are assumed to occur only in that run. The tuple being added in FIG. 11, (4, 4), duplicates a tuple in the run, thus invalidating that run. The run is then split into subruns that do not contain the tuples with duplicated values.

FIG. 12 diagrams the state of the interior node from FIG. 10 after the tuple (4, 4) has been added. The two resulting subruns omit (4, 4), which has been inserted into the single-tuple list.

The form used inside the interior node is shown in FIG. 13. The two entries on the left in FIG. 13 represent the two runs in the node's tuple run list. The first run starts with token 0 and has a length of 3, and the second run starts with token 4 and has a length of 2. The entry on the right denotes token 3 is associated with left & right values of (4, 4), and has a count of 2.

(c) It may not do either (a) or (b), and is in the single-tuple list.

In this case we increment the count associated with the tuple in the single-tuple list.

(d) It may not do either (a) or (b), and the pair is not in the single-tuple list.

In this case, we add the tuple to the single-tuple list with a count of one.

4. Access of Subset of a Record

To efficiently access a subset of a record, the gate fields of the interior nodes are set as previously described. We look at an example of accessing a record subset. The algorithm of FIG. 14 is applied to a tree root to retrieve a token record for a given record number, and a subset of the fields.

See FIG. 14. The input to the algorithm is:

(a) the token number of the record to be retrieved, (b) a node to search from (c) the location to store the next token retrieved The token number originally supplied to the algorithm is the record number. The node to search for is initially the root node over the subset of fields to be retrieved.

We look up left and right values from the given token number. If said node has a gate value of 1 or 3, we recursively search the node's left subtree, with said left value. If said node has a gate value of 2 or 3, we recursively search the node's right subtree, with said right value.

When a leaf is reached, we store the given token number at the next location in the token record we're constructing. We also increment the token-record location to point to the next space.

CONCLUSION, RAMIFICATIONS, AND SCOPE

Thus the reader will see that my invention provides a more compact method of storing data records. This provides several benefits, including fitting larger data sets into main memory, allowing the data sets to be processed faster, improving the speed of loading/storing data between main memory and disk, and providing more efficient transmission and archival of said data sets.

An efficient algorithm for retrieving a record subset from this storage method is presented. A flexible algorithm for tree design is also presented.

While my above description contains many specificities, these should not be construed as limitations on the scope of the invention, but rather as an exemplification of one preferred embodiment thereof.

Accordingly, the scope of the invention should be determined not by the embodiment(s) illustrated, but by the appended claims and their legal equivalents.

I claim:

1. A computer-implemented method for improving compression for storage of a plurality of parallel data element sequences comprising:

(a) Creating one or more dictionaries of unique values for each of said data element sequences, wherein said one or more dictionaries associate(s) a numeric index with each unique value, (b) forming an n-ary tree with leaf and interior nodes wherein:

(1) each said leaf node corresponds to one of said one or more dictionaries, (2) each said interior node associates a numeric index with tuples of numeric indexes from other subordinate leaf or interior nodes, (3) one or more interior nodes store one or more sequences of mutually-consecutive tuples by representing said sequences in a form that uses less storage space than representing said sequences as individual tuples, and (4) one or more interior nodes perform at least one of:

i. record the addition of a tuple that extends a tuple sequencing by modifiying one or more fields in the representation of said sequence that are capable of representing the length of said sequence, or ii. record the addition of a tuple that invalidates an existing tuple sequence by splitting said tuple sequence into one or more subsequences, wherein none of the tuples of said subsequences contain any element of said added tuple, or iii. record the addition of a tuple that has not been previously added to said interior node, wherein said added tuple does not extend a tuple sequence, by adding said tuple to a tuple collection, and wherein the forming step defines:

a problem space comprising:

(1) a set of states, wherein each said state has an n-ary tree design, said design comprising a set of leaves and zero or more interior nodes, wherein each said interior node contains zero or more other nodes as children, and (2) a value function, giving a numeric ranking of the value of any state n-ary tree design, wherein said numeric ranking is used to perform at least one of:

a determine if said state n-ary design is acceptable or b rank the n-ary tree designs of states reachable by applying operators to a state, to select an operator, defining one or more operators that transform one state to another, and searching said problem space, starting from an initial state and applying operators to move to other states until a state with an acceptable n-ary tree design is reached.

2. The method of claim 1, wherein said tree-arrangement method uses an operator that joins two or more nodes (leaf nodes or interior nodes) under an interior node.

3. The method of claim 1, wherein each unique value of a leaf node or each unique tuple of an interior node is capable of being associated with a count of the number of times that value of tuple of values occurred in the parallel data element sequences.

4. The method of claim 1, wherein said method is used to compress a table, wherein said parallel data element sequences represent fields of said table's records.

5. The method of claim 1 wherein at least one of said leaf nodes is distinct from, and represents a subset of values from one of said dictionaries.

6. The method of claim 5, further including a method for efficiently processing elements from a subset of said parallel data element sequences, comprising:
  (a) defining a gate field for one or more interior nodes,
  (b) processing the leaves corresponding to said subset of sequences by:
    (1) setting the value of said gate field for each said interior node, to indicate which of said interior node's branches lead to leaf node in said subset,
    (2) following paths that lead to said leaf nodes, and
    (3) processing said elements in said leaf nodes encountered.

7. The method of claim 1, further including a method for efficiently processing elements from a subset of said parallel data element sequences, comprising:
  (a) defining a gate field for one or more interior nodes,
  (b) processing the leaves corresponding to said subset of sequences by:
    (1) setting the value of said gate field for each said interior node, to indicate which of said interior node's branches lead to leaf nodes in said subset,
    (2) following paths that lead to said leaf nodes, and
    (3) processing said elements in said leaf nodes encountered.

8. The method of claim 1, wherein said problem space is represented by a state containing leaves and zero or more interior nodes, wherein said state representation can be modified by operators to represent different states, and said value function is a function of the actual or estimated sizes of a state's interior and/or leaf nodes.

9. The method of claim 8, wherein said estimate of interior node size uses a function of the sizes or estimated sizes of said interior node's child nodes.

10. A computer-implemented method for improving compression for storage of a plurality of parallel data element sequences comprising:
  (a) creating one or more dictionaries of unique values for each of said data element sequences, wherein said one or more dictionaries associate(s) a numeric index with each unique value,
  (b) forming one or more n-ary trees with leaf and interior nodes wherein:
    (1) at least one of said leaf nodes is distinct from, and represents a subset of values from one of said dictionaries,
    (2) each interior node associates a numeric index with tuples of numeric indexes from other subordinate leaf or interior nodes, wherein the forming step defines:
  a problem space comprising:
    (1) a set of states, wherein each said state has an n-ary tree design, said design comprising a set of leaves and zero or more interior nodes, wherein each said interior node contains zero or more other nodes as children, and
    (2) a value function, giving a numeric ranking of the value of any state n-ary tree design, wherein said numeric ranking is used to perform at least one of:
      a. determine if said state's n-ary tree design is acceptable, or
      b. rank the n-ary tree designs of states reachable by applying operators to a state, to select an operator,
  defining one or more operators that transform one state to another, and
  searching said problem space, starting from an initial state and applying operators to move to other states until a state with an acceptable n-ary tree design is reached.

11. The method of claim 10, wherein said method for arranging an n-ary tree uses an estimate of interior node size, from a function of the sizes or estimated sizes of said interior node's child nodes.

12. The method of claim 10, wherein said tree-arrangement method uses an operator that joins tow or more nodes (leaf nodes or interior nodes) under an interior node.

13. The method of claim 10, wherein each unique value of a leaf node or each unique tuple of an interior node is capable of being associated with a count of the number of times that value or tuple of values occurred in the parallel data element sequences.

14. The method of claim 10, further including a method for efficiently processing elements from a subset of said parallel data element sequences, comprising:
  (a) defining a gate field for one or more interior nodes,
  (b) processing the leaves corresponding to said subset of sequences by:
    (1) setting the value of said gate field for each interior node, to indicate which of said interior node's branches lead to leaf nodes in said subset,
    (2) following paths that lead to said leaf nodes, and
    (3) processing said elements in said leaf nodes encountered.

15. A computer-implemented method for storage of a plurality of parallel data element sequences, and efficiently processing elements from a subset of said sequences, comprising:
  (a) creating one or more dictionaries of unique values for each of said data element sequences, wherein said one or more dictionaries associate(s) a numeric index with each unique value,
  (b) forming one or more n-ary trees with leaf and interior nodes wherein:
    (1) each leaf node corresponds to one of said one or more dictionaries,
    (2) each interior node associates a numeric index with tuples of numeric indexes from other subordinate leaf or interior nodes,
    (3) a gate field is defined for one or more interior nodes,
  (c) processing the leaves corresponding to said subset of sequences by:
    (1) setting the value of said gate field for each said interior node, to indicate which of said interior node's branches lead to leaf nodes in said subset, (2) following paths that lead to said leaf nodes, and
(3) processing said elements in said leaf nodes encountered, wherein the forming step defines:
a problem space comprising:
  (1) a set of states, wherein each said state has an n-ary tree design, said design comprising a set of leaves and zero or more interior nodes, wherein each said interior node contains zero or more other nodes as children, and
  (2) a value function, giving a numeric ranking of the value of any state n-ary tree design, wherein said numeric ranking is used to perform at least one of:
    a. determine if said state n-ary tree design is acceptable, or
    b. rank the n-ary tree designs of states reachable applying operators to a state, to select an operator,
  defining one or more operators that transform one state to another, and
searching said problem space, starting from an initial state and applying operators to move to other states until a state with an acceptable n-ary tree design is reached.

16. The method of claim 15, wherein said method for arranging an n-ary tree uses an estimate of interior node size, from a function of the sizes or estimated sizes of said interior node's child nodes.

17. The method of claim 15, wherein said tree-arrangement method uses an operator that joins two or more nodes (leaf nodes or interior nodes) under an interior node.

18. The method of claim 15, wherein each unique value of a leaf node or each unique tuple of an interior node is capable of being associated with a count of the number of times that value or tuple of values occurred in the parallel data element sequences.

19. The method of claim 15, where said processing includes using values or tokens at said leaf nodes to reconstruct a subset of a stored record.

20. The method of claim 19, further including the step of adding one or more of said reconstructed record subsets to another tree.

* * * * *